United States Patent [19]

Zeitlin

[11] Patent Number: 4,787,654

[45] Date of Patent: Nov. 29, 1988

[54] FLANGE CONNECTION WITH IMPROVED SEAL AND BOLT-NUT DESIGN

[75] Inventor: Alexander Zeitlin, White Plains, N.Y.

[73] Assignee: Press Technology Corporation, White Plains, N.Y.

[21] Appl. No.: 65,615

[22] Filed: Jun. 30, 1987

Related U.S. Application Data

[63] Continuation of Ser. No. 856,707, Apr. 28, 1986, abandoned.

[51] Int. Cl.⁴ ............................................. F16L 23/00
[52] U.S. Cl. .................................... 285/101; 285/363; 285/365
[58] Field of Search ....... 285/365, 366, 363, 367 (U.S. only), 285/101; 411/423, 411, 436

[56] References Cited

U.S. PATENT DOCUMENTS

| | | | |
|---|---|---|---|
| 1,909,489 | 5/1933 | Eaton | 411/436 |
| 2,150,876 | 3/1939 | Caminez | 411/423 |
| 2,349,651 | 5/1944 | Davis | 411/436 |
| 3,156,475 | 11/1964 | Gerard et al. | 277/173 X |
| 3,210,096 | 10/1965 | Van Der Wissel | 411/423 X |
| 3,575,432 | 4/1971 | Taylor | 285/367 |
| 4,549,754 | 10/1985 | Saunders et al. | 411/423 |
| 4,688,832 | 8/1987 | Ortloff et al. | 285/334 X |

OTHER PUBLICATIONS

"High Pressure Technology: Industrial Applications", *Mechanical Engineering*, Dec. 1965.

*Primary Examiner*—Thomas F. Callaghan
*Attorney, Agent, or Firm*—Ostrolenk, Faber, Gerb & Soffen

[57] ABSTRACT

A new and improved flange connection design is disclosed which lowers weight, cost and size. Briefly stated, truncated threads are used in the flange area which more uniformly distribute stress concentrations and allows a smaller bolt and nut to be utilized. Further, a self-energizing seal which uses the pressure inside the conduit to greatly facilitate the flange connection sealing function. This therefore allows lower forces to be utilized when clamping the two flanges together which results in less expensive, smaller and less costly flange connection construction as well as still further reductions in the size of the nuts and bolts utilized.

2 Claims, 6 Drawing Sheets

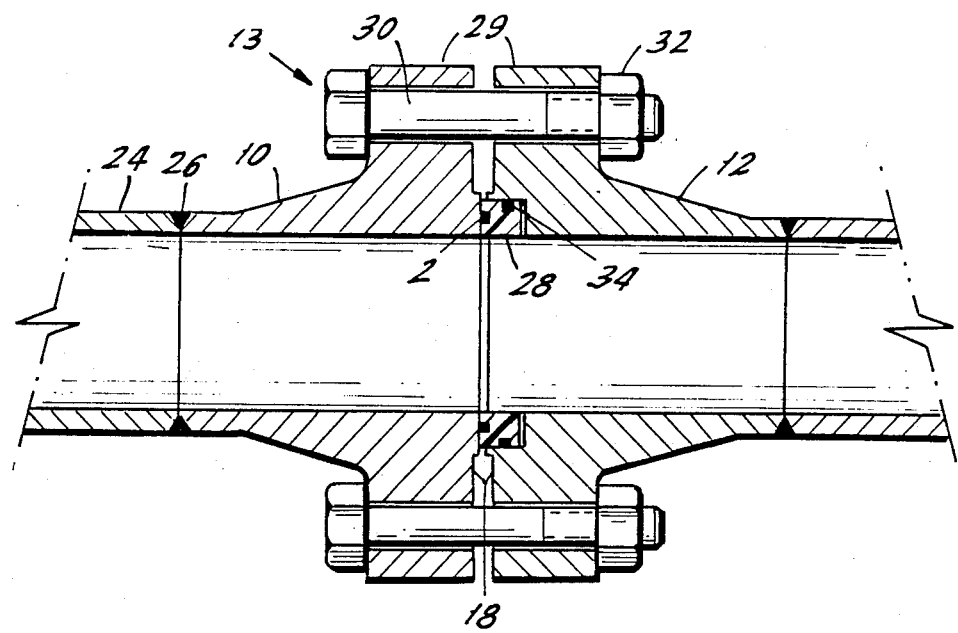
FIG. 7.
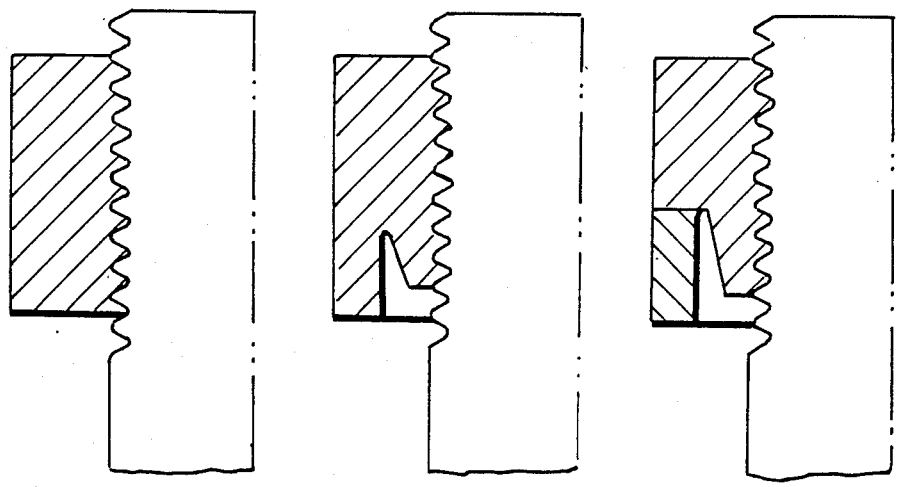
FIG. 10A. CONVENTIONAL NUT
FIG. 10B. RECESSED NUT
FIG. 10C. COLLAR SUPPORTED NUT

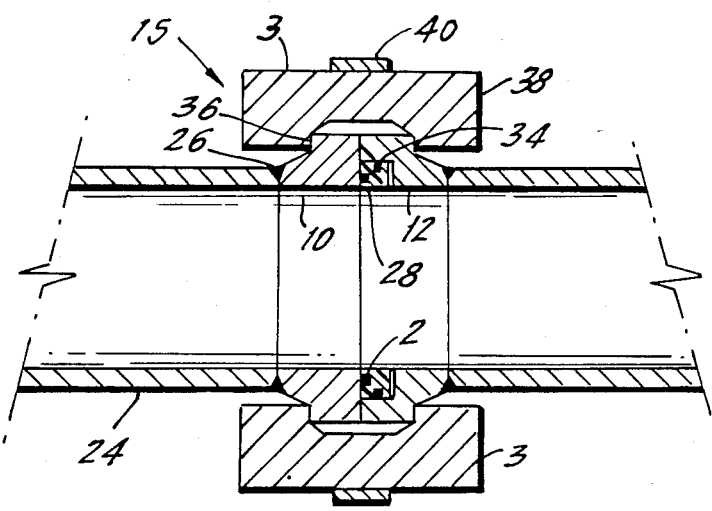
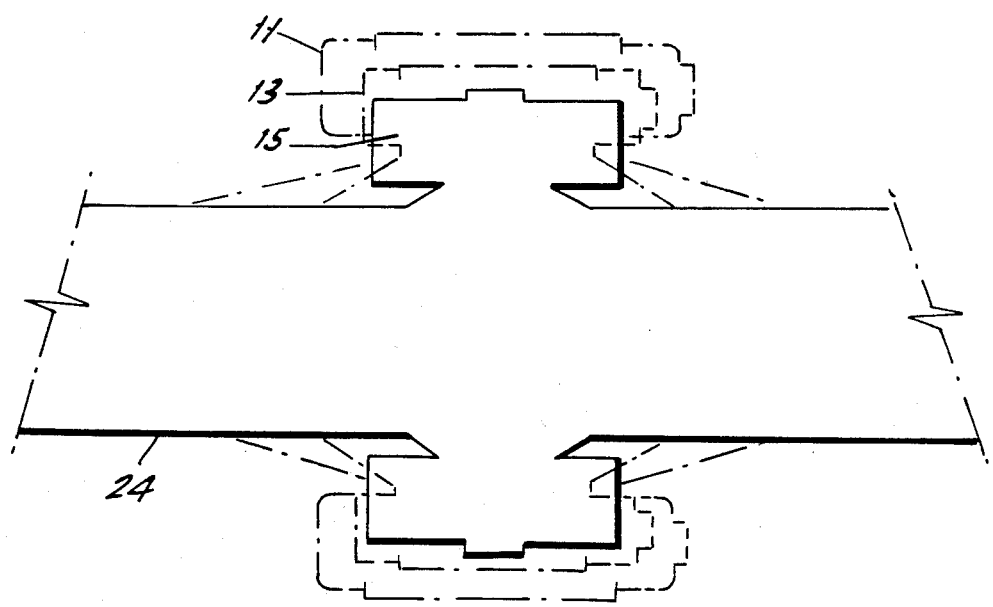

FLANGE CONNECTION WITH IMPROVED SEAL AND BOLT-NUT DESIGN

This is a continuation of application Ser. No. 856,707 filed on Apr. 28, 1986 now abandoned.

BACKGROUND OF THE INVENTION

This invention relates, generally, to a flange connection and more particularly to a flange connection having a lower profile and less weight through the use of a different seal and nut-bolt design.

In virtually every conduit or pipe installation where moderate to high pressures exist, a problem is always encountered as to flange design and usage. There are presently many flange structures on the market which are attached to conduit or the like by welding or compression type fittings. The relative size and complexity of these flanges varies with the size of the pipe and the pressure therein. Naturally, the larger the pipe and/or the pressure, the more expensive the flange connection. A typical 12" connection for 2500 psi will cost about $3,000–4,000.

An example, an extended industrial installation in the several thousand pound pressure range may easily have 60–70 flange connections. Obviously then, the cost of flange connections is a substantial factor in the overall cost of a project.

Further, flange connections have a tendency to be both heavy and bulky which further complicates installation.

Another problem with conventional flanges is the fact that they are subject to failure. This failure may be the result of seal failure, bolt failure or improper initial installation. It has been found that flange design lends itself to improper installation.

A typical prior art flange connection can be found, for example, in FIG. 1. Shown is a typical left and right half 10, 12 of a flange connection. The flanges have standard rims 20 which facilitate the use of a required number of conventional bolts 14 and conventional nuts 16. The flange faces 1 cooperate with the conventional therebetween. As is presently known, this type of arrangement, although quite common is quite problematic. More particularly, that portion of the flange face 1 adjacent the seal 22 must be relatively smooth or early seal failure will result. Further, the design itself requires that, for high pressure lines, a substantial number of bolts must be utilized, which must be torqued to a very high value in relation to the sealing pressure. Also, since buttress type threads for bolts and nuts are utilized, the bolts and nuts themselves must be of a substantial size.

By also referring to FIGS. 2A, 2B and 2C, there is illustrated prior art representations of conventional flange arrangements. Here, it can be readily seen how misalignment between the rims 20 due to uneven torquing of the bolts 14, results in skewing therebetween. Also evident is how this skewing causes conventional seals such as 22 to deform. As is obvious and readily known, improper seating of the seals 22 may cause early failure or leakage.

Referring to FIGS. 3, 4A and 4B, there is diagrammatically shown schematic and representational force and cross-sectional views of standard buttress type threads which are used in conventional flange connections. Due to the nature of buttress threads, one side of a thread is almost virtually perpendicular to the axis. As a result, nut threads closest to the support are stressed much more than the threads further away as is evident in FIG. 3. Therefore, the design of the flange connections must be based on stresses in the highest stressed first turn of the thread. This is one of the main reasons that substantial size bolts and nuts are used.

Yet however, buttress threads are standard for use in flange connections. The reason for buttress thread usage is that well over one hundred years ago, designers were concerned with the possibility of a nut freezing onto the bolt. They therefore favored a split nut design which allows the knocking off of the two halves of a nut even when the threaded joint was under load. As is readily known, a split type nut performs better when the thread reaction does not have a radial component which would produce a radial bursting force. Since the bearing surface of the buttress thread is substantially perpendicular to a bolt axis, it does not generate radial forces. Therefore, this type of thread was preferred by many designers. Today, however, proper coatings by all kinds of lubricants ensure smooth working of a nut without the danger of freezing. However, conventional design still prevails with the result that buttress threads are used even though other types of threads, such as truncated thread, are available.

Clearly, any solution which will lower the size, weight and cost of flange connections requires an improved seal and an improved nut and bolt design.

SUMMARY OF THE INVENTION

Accordingly, it is an object of the present invention to produce a flange connection which utilizes a seal or gasket which is more efficient than presently used conventional seals. It is another object of the present invention to preferably use a self-energizing type seal which utilized the pressure in the conduit to aid in sealing the connection as opposed to brute force bolting requirements as is conventionally done.

It is still a further object of the present invention to use a different thread design for a bolt and nut than is conventionally used and which distributes stress concentration more uniformly over the length of the threaded components.

It is yet another object of the present invention to produce a flange connection, comprising a first conduit section and a first flange having a conduit mating end and a flange mating end, wherein the conduit mating end is connected to the first conduit section. A second flange is adjacent the first flange and has a conduit mating end and a flange mating end, wherein the conduit mating end is connected to a second conduit section. A self-energizing seal means is disposed between the first and the second flanges and uses pressure in the conduit to aid in forming a seal between the first and second flanges. A threaded bolt and recessed or collar-supported nut connect the first and second flanges wherein stresses on the threads are uniformly disposed over all of the threads.

Such a device combining improved seal, thread and nut design is taught by the present invention.

BRIEF DESCRIPTION OF THE DRAWINGS

Reference may now be had to the drawings in which:

FIG. 7 shows a cross-sectional view taken through a flange connection of the present invention;

FIG. 8 shows a cross-sectional view taken through an alternate clamping arrangement in the flange connection of the present invention;

FIG. 9 illustratively compares flange connection size as used by the two embodiments of the present invention in comparison to conventional or prior art flange connections; and FIGS. 10A-10C illustratively compare conventional nut design with the nuts used in the present invention.

DESCRIPTION OF PREFERRED EMBODIMENT

Figure 1:
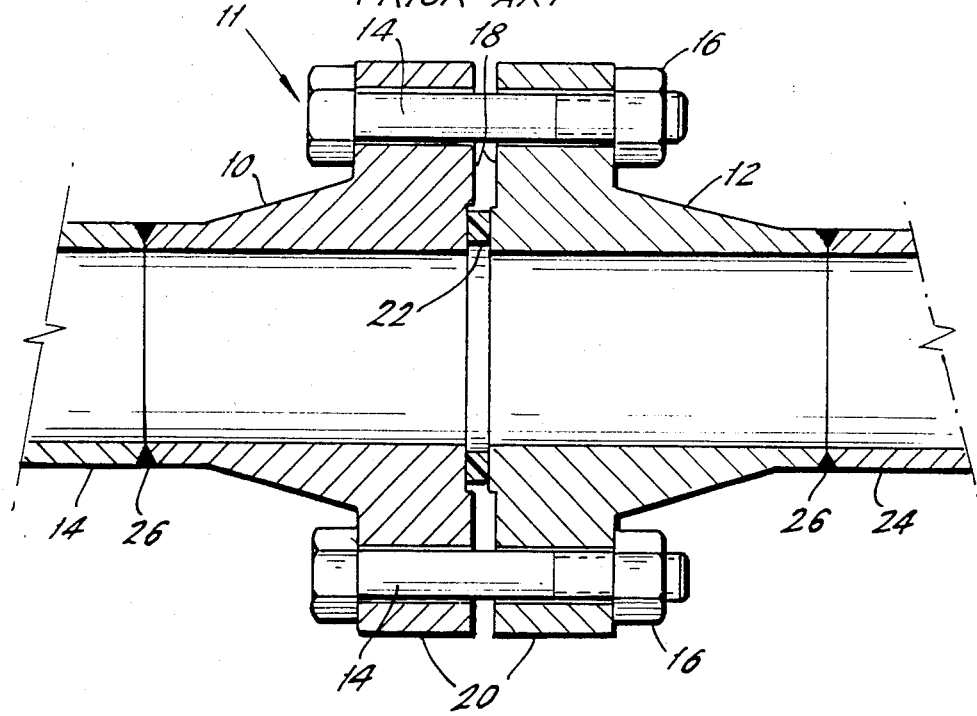
FIG. 1 is a cross-sectional view taken through a conventional flange arrangement as used in the prior art.
Figure 2A:
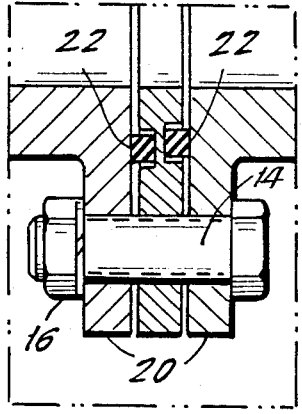
FIGS. 2A, 2B and 2C show flange misalignment in conventional arrangements of the prior art.
Figure 2B:
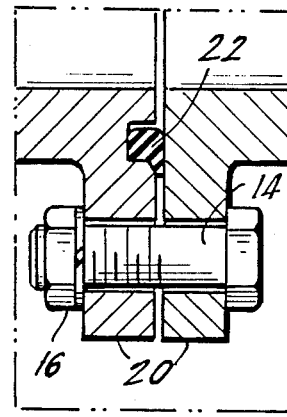
Figure 2C:
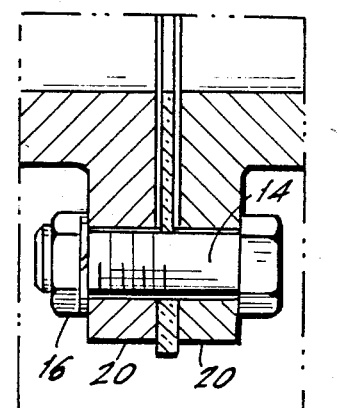

A conventional or prior art flange arrangement may be seen by referring to FIG. 1. The flange connection shown generally at 11 is formed from a left and right flange 10, 12 which is connected to conduit 24 through the use of a weld 26. Therefore, an appropriate length of conduit 24 can be utilized with the flange connections 11 placed wherever needed. It should be noted, that in standard flange connection designs, the effectiveness of a conventional seal 22 is dependent to a large extent upon the force exterted on it. Therefore, should the flanges 10, 12 be askew as shown in FIGS. 2A, 2B or 2C, the effectiveness of the seal 22 is in question unless excessive sealing forces are applied to bolts 14 and nuts 16.

Further, since the quality of the fit by the seal 22 is dependent upon the forces exerted by the flanges 10, 12, the forces exerted by the bolt and nut 14, 16 are equally critical and must in fact be capable of exerting extremely high forces. This is particularly so in a high pressure system where, for example, the inside diameter of the conduit may be approximately 10½" while the pressure therein is on the order of 2500 psi or higher. These flange connections and seals may come in a variety of configurations and materials and may include elastomers, asbestos in conjunction with a binder, spiral wound metal, corrugated metal, grooved metal, or ring type joints to name a few. Further, depending upon the type of seal 22 utilized, the forces necessary to adequately seal the flange connection vary, thereby putting even greater stresses onto the bolt and nut combinations.

Figure 3:
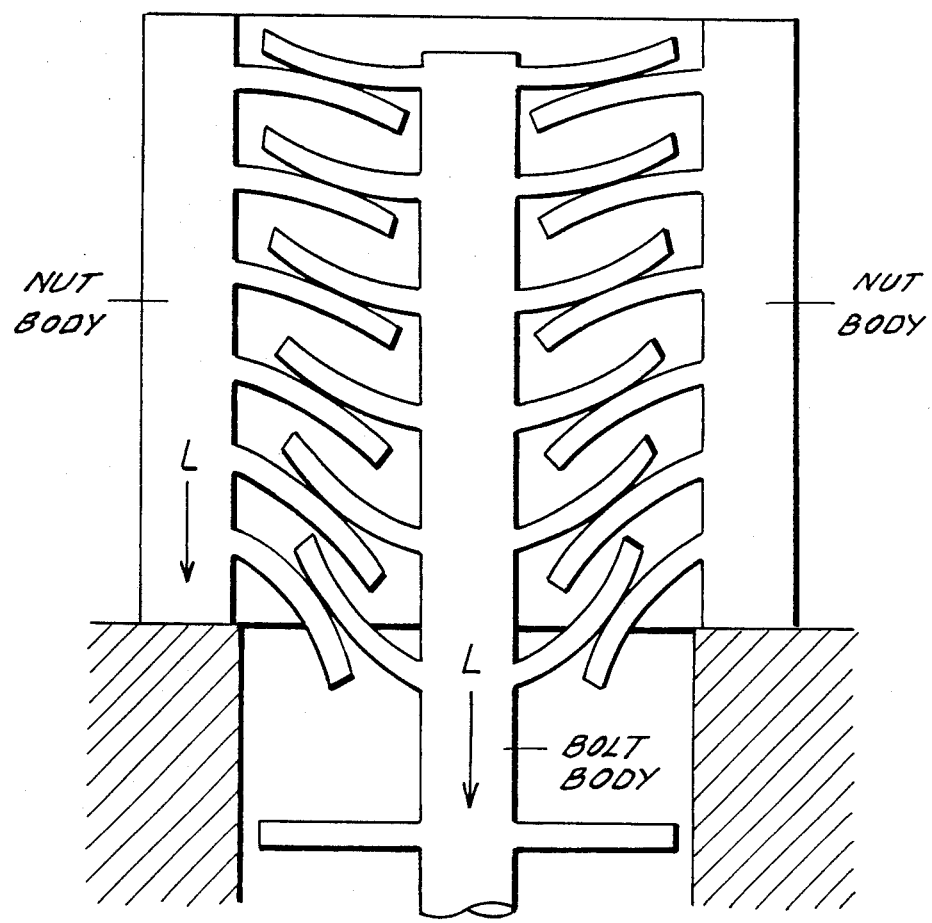
FIG. 3 is a representational view of the force-thread stress distribution and resulting deflection distribution in a conventional buttress thread.
Figure 4A:
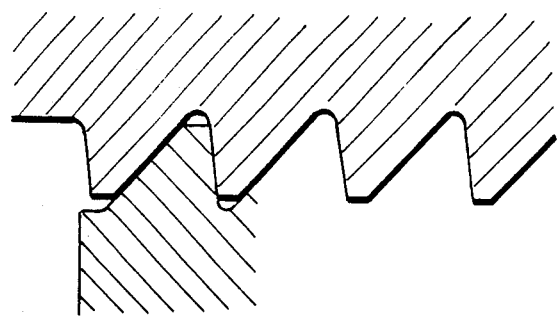
FIGS. 4A and 4B show the thread detail of a conventional buttress thread.
Figure 4B:
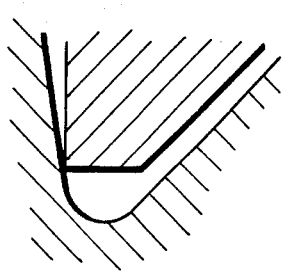

A diagram of a buttress thread which is used in conventional bolts and nuts for flange connections may be seen by referring to FIGS. 4A and 4B. Here it can be seen that the bearing surface of the thread is only 7° off the perpendicular axis of the bolt. Therefore, most of the forces generated between the nut and the bolt are taken up by the first few threads as diagrammatically shown in FIG. 3. Since the force is not uniformly distributed over the length of the bolt, the uniform diameter of the bolt must be sufficiently enlarged since only the first section performs most of the work.

Figure 5:
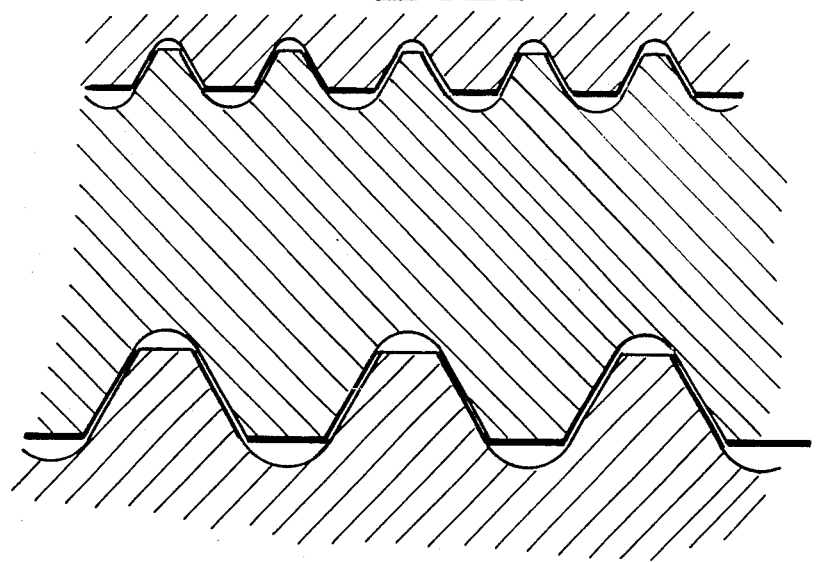
FIG. 5 shows a truncated thread design as used in the flange connection of the present invention.
Figure 6A:
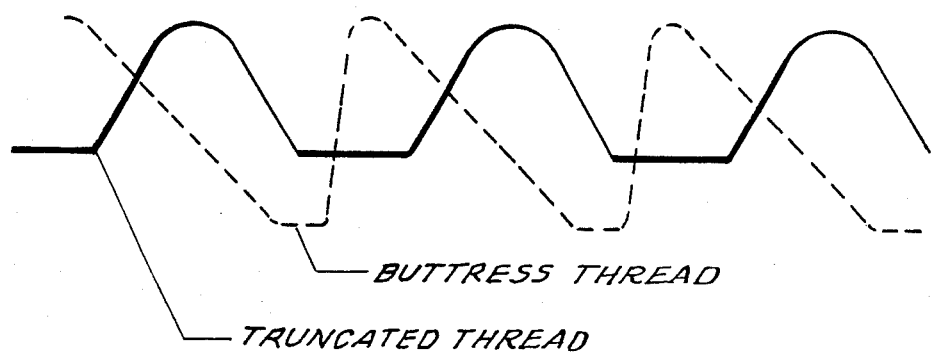
FIGS. 6A and 6B compare conventional buttress thread to truncated thread configuration and stress concentrations respectively.
Figure 6B:
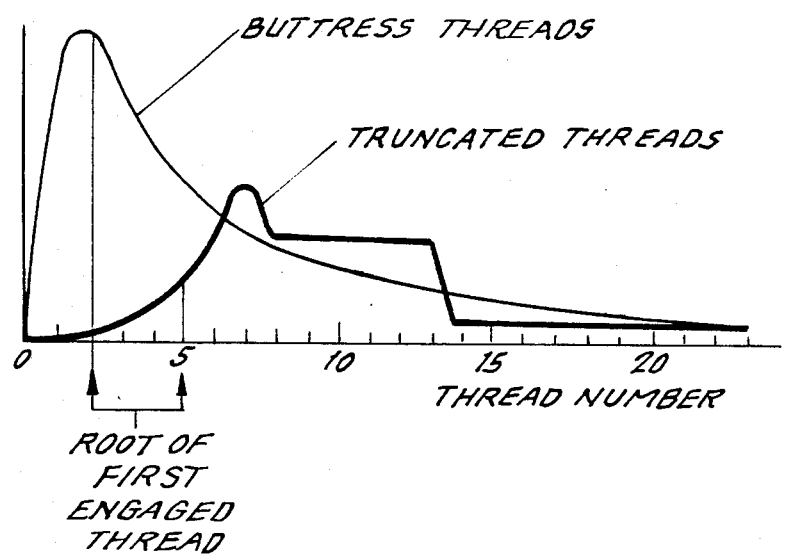

It has been found that in order to reduce the overall size of a flange connection, as well as its weight and cost, a different thread design must be utilized which would therefore allow a smaller diameter bolt and nut to be used. Accordingly, the truncated threads as shown in FIG. 5 are preferred. These truncated surfaces of the threads are preferably at 60° although the angle may change. Since, as previously mentioned, many lubricants are available which will prevent the nut from freezing onto a bolt, this design is now workable. These truncated threads will distribute the forces much more uniformly over the axial length of the threaded portion of the bolt. It has been found that the use of this thread, which is generally triangular in shape, produces stress concentrations which are less than 50% of those existing in buttress threads, as shown in FIG. 6B. Further, by referring to FIG. 6A a comparison between the two threads may be seen.

As a result of a more even distribution of stress concentrations, the diameter of the bolts may therefore be decreased. This will therefore result in a smaller flange diameter with an attendant decrease in weight, size and of course, cost to manufacture and install.

A complete design of a flange connection utilizing the present invention is shown in FIG. 7. This flange connection shown generally at 13 is again comprised of a left and right flange 10, 12 which are connected to conduits 24 by welding 26. The right flange 12 has a cutout or recess 34 which allows a self-energizing seal 2 to be disposed therein. This type of seal is described in U.S. Pat. Nos. 3,223,003 and 3,156,475 which are specifically incorporated by reference herein. These seals utilize the pressure in the conduit 24 to exert force on the seal 2. Therefore, it is not necessary for the bolt and nut to perform all of the work in accomplishing a sealed joint. This therefore further lowers the physical property requirements of the truncated threaded bolt 30 and truncated threaded nut 32 with the result that an even smaller flange 13 may be used.

In order to make the first turns of the thread in the nut more elastic, the nut designs shown in FIGS. 10B and 10C are preferably used as compared to the conventional nut in FIG. 10A.

An alternate flange connection clamping structure is shown in FIG. 8. This flange is shown generally at 15 and is again connected to the pipe 24 by weld 26. The flange connection 15 is made up of a left and right flange 10, 12 with a recess 34 disposed therein for the placement of a self-energizing seal 2. The outer annular portion of the flange connection 15 has lips 36 which mate with two-piece clamp 3. This two-piece clamp 3 is held in place by a thin ring 40. The thin ring 40 may be extremely small in comparison to the stresses inside the conduit 24 since it is not exposed to any forces or stresses itself. Alternately the flange connection 15 may also be held together by bolts or screws (not shown). It has been found that this two-piece clamp design will further lower the size, weight and cost of the flange connection.

Accordingly, by referring to FIG. 9 there is shown a comparison between flange connections 11, 13 and 15 which illustrates the approximate percentage of size reduction. Of course, this size reduction will, as mentioned, result in lower weight, lower manufacturing and lower installation costs.

Accordingly, the present invention produces an improved flange connection design which makes much more efficient use of present day designs for the use of different thread and seal arrangements than are presently being used. It is to be understood however that many variations of the present invention may be practiced without departing from the spirit and scope of the present invention. For example, different thread designs which still accomplish the same purpose, that is, more uniform stress distribution over the length of the bolt and nut, may be utilized. Further, different types of seals which do not rely as heavily on flange mating forces but still use the pressure inside the conduit to perform the sealing function, may be used.

Although the present invention has been described in connection with preferred embodiments thereof, many other variations and modifications will now become apparent to those skilled in the art. It is preferred, therefore, that the present invention be limited not by the specific disclosure herein, but only by the appended claims.

What is claimed is:

1. A flange connection for relatively high pressure applications, comprising:
    a first conduit section;
    a first flange having a conduit mating end and a flange mating end, said conduit mating end connected to said first conduit section;
    a second conduit section;
    a second flange having a conduit mating end and a flange mating end, a cutout section disposed in said flange mating end of said second flange, said conduit mating end connected to said second conduit section wherein said flange mating end is adjacent said first flange;
    self-energizing seal means disposed between said flange mating ends of said first and said second flanges and in said cutout section disposed in said second flange;
    a high pressure medium disposed in said first and second conduit sections, said high pressure medium having a pressure of at least 2,500 pounds per square inch, said high pressure medium being effective to bear on said self-energizing seal means and to increase pressure exerted by said seal means on said flange by a pressure factor which increases with the pressure of said high pressure medium; and
    threaded fastening means for connecting said first flange and said second flange, said threaded fastening means including a plurality of sets of bolts and nuts, each bolt having a plurality of threads and substantially all of said threads being truncated in a manner which is effective to distribute, substantially uniformly, the stresses on said bolt along all said threads.

2. A flange connection for relatively high pressure applications according to claim 1, wherein said self-energizing seal means utilizes pressure contained in said conduit to aid in forming a seal a between said first flange and said second flange.

* * * * *